United States Patent [19]

Becker et al.

[11] Patent Number: 4,788,031
[45] Date of Patent: Nov. 29, 1988

[54] CONCRETE REACTOR PRESSURE VESSEL FOR A GAS COOLED NUCLEAR REACTOR OF LOW CAPACITY

[75] Inventors: Gerhard Becker, Mannheim; Josef Schoening, Hambruecken, both of Fed. Rep. of Germany

[73] Assignee: Hochtemperatur-Reaktorbau GmbH, Fed. Rep. of Germany

[21] Appl. No.: 8,833

[22] Filed: Jan. 30, 1987

Related U.S. Application Data

[63] Continuation-in-part of Ser. No. 866,921, May 22, 1986, Pat. No. 4,701,298.

[30] Foreign Application Priority Data

Feb. 1, 1986 [DE] Fed. Rep. of Germany ....... 3603090

[51] Int. Cl.$^4$ .................. G21C 1/22; G21C 13/02; G21C 15/12
[52] U.S. Cl. .................. 376/296; 376/273; 376/299; 376/381; 376/406
[58] Field of Search ............... 376/273, 276, 293, 295, 376/296, 298, 381, 383, 406

[56] References Cited

U.S. PATENT DOCUMENTS

| | | | |
|---|---|---|---|
| 3,372,092 | 3/1968 | Margen | 376/295 |
| 3,398,493 | 8/1968 | Massey | 376/296 |
| 4,526,742 | 7/1985 | Hannerz | 376/298 |
| 4,545,954 | 10/1985 | Ullrich et al. | 376/381 |
| 4,661,313 | 4/1987 | Schöning et al. | 376/295 |
| 4,701,298 | 10/1987 | Schöning et al. | 376/296 |

FOREIGN PATENT DOCUMENTS

| | | | |
|---|---|---|---|
| 273779 | 10/1964 | Australia | 376/296 |
| 3009390 | 9/1981 | Fed. Rep. of Germany | 376/299 |
| 3121377 | 12/1982 | Fed. Rep. of Germany | 376/296 |
| 3321255 | 12/1984 | Fed. Rep. of Germany | 376/295 |

*Primary Examiner*—Harold J. Tudor
*Assistant Examiner*—Richrd W. Wendtland
*Attorney, Agent, or Firm*—Robert J. Koch

[57] ABSTRACT

A concrete reactor pressure vessel for a low capacity, gas cooled nuclear reactor is provided. To assure the safe containment of the cooling gas in an economical manner and to remove the heat generated in the reactor core, the pressure vessel is equipped with reinforcing or prestressing elements. Cooling gas transfers its heat to a heat exchanger means consisting of the liner of the pressure vessel and cooling pipes mounted on the concrete side of the liner with water flowing through the cooling pipes. The heat exchanger comprises on the secondary side at least two mutually independent systems, each provided with collector pipe means located outside the reactor pressrue vessel for the forerunnings and afterrunnings of the cooling water. Each cooling pipe is connected by means of an inlet and a drain line with the corressponding collector pipe means.

17 Claims, 3 Drawing Sheets

CONCRETE REACTOR PRESSURE VESSEL FOR A GAS COOLED NUCLEAR REACTOR OF LOW CAPACITY

This application is a continuation-in-part of U.S. Ser. No. 866,921, filed May 27, 1986, now U.S. Pat. No. 4,701,298.

BACKGROUND OF THE PRESENT INVENTION

The invention relates to a concrete reactor pressure vessel for a gas cooled, low capacity nuclear reactor which includes a pile of spherical fuel elements, said pressure vessel consisting of a cylindrical jacket, a bottom plate and an optionally removable cover plate and including in the interior thereof a plurality of cooling pipes through which water flows for the removal of heat.

A reactor pressure vessel of this type is described in German patent application No. P 35 34 422.9. The underground vessel consists of steel reinforced concrete and comprises a cooling system mounted on an inner surface, whereby the heat generated by the pile of fuel elements is removed from the pressure vessel. The pressure of the gas in the primary loop of the nuclear reactor is chosen so that it is higher than the pressure of the medium (i.e., water) in the cooling system.

German application No. P 35 18 968.1 describes a reactor pressure vessel for a low capacity nuclear reactor having spherical fuel elements, said pressure vessel consisting of steel reinforced concrete and installed underground. This reactor pressure vessel has no removable cover plate, but is equipped with a closable center opening in the area of the cover. As in the aforecited application, the heat generated in the reactor core is transferred by a cooling gas flowing through the pile of fuel elements from top to bottom to a cooling system provided on the inner surface of the pressure vessel. Here, however, the cooling system is separated from the primary loop by a gas tight jacket.

The nuclear reactor shown in the two patent applications are characterized by a compact configuration and an extensive avoidance of active operating installations, such as charging means, gas purification facilities, control systems and safety systems. It is particularly suitable for the generation of thermal energy for heating purposes. However, the underground installations involves higher costs.

Based on the afore-cited state of the art, it is an object of the present invention to provide a concrete reactor pressure vessel for a low capacity gas cooled nuclear reactor, which may be manufactured in a cost effective manner, while assuring the safe containment of the cooling gas, and which simultaneously is capable of economically removing the heat produced in the reactor core.

SUMMARY OF THE PRESENT INVENTION

The reactor pressure vessel of the present invention is characterized by the following elements:
(a) a cylindrical concrete jacket which is traversed in the radial and axial directions in a known manner by reinforcing means such as prestressed cables, which reinforcing means absorbs all of the tensile forces resulting from the internal pressure of the vessel and other stresses;
(b) the reactor pressure vessel is sealed in a known manner on the inside of the cylindrical concrete jacket by a metal liner, on the concrete jacket side of which cooling pipes are mounted, with the metal liner being anchored to the concrete jacket by means of the cooling pipes;
(c) the metal liner and the cooling tubes together serve to absorb heat from the cooling gas of the nuclear reactor;
(d) heat exchanger means comprising on the secondary side at least two systems independent of each other, the cooling pipes of which are connected by inlet and outlet lines radially placed in the concrete with collecting pipe means outside the reactor pressure vessel for the forerunnings and afterrunnings; and
(e) cooling pipes adjacent to each other with their inlet and outlet lines belong to different systems and traversed by the flow in opposite directions.

The reactor pressure vessel according to the present invention comprises a steel reinforced or prestressed concrete structure having a load bearing and sealing function. The concrete and the reinforcing or prestressing elements absorb the forces of the entire internal pressure of the vessel. The metal liner acts as a sealing skin anchored by means of the cooling pipes in the concrete. If necessary, bolts may be used in a supplmentary fashion. The cavity which houses the nuclear reactor may be closed off or sealed by a removable cover plate, so that after the cover plate is removed, parts of the nuclear reactor may be dismantled or the fuel elements may be replaced.

Since the inlet and outlet lines connecting the cooling pipes with the collecting pipe means are installed radially in the concrete, they make possible together with the radially arranged reinforcing or prestressing elements, in case of an accident, the rapid transfer of heat to the outside. The particular configuration of the heat exchanger thus also protects the concrete vessel against excessive thermal loads. Since adjacent cooling pipes belong to different systems and are traversed by a flow in opposite directions, an overall uniform temperature is established in the liner.

DETAILED DESCRIPTION OF THE PRESENT INVENTION

The present invention is described in greater detail below with reference to the drawings.

Figure 1:
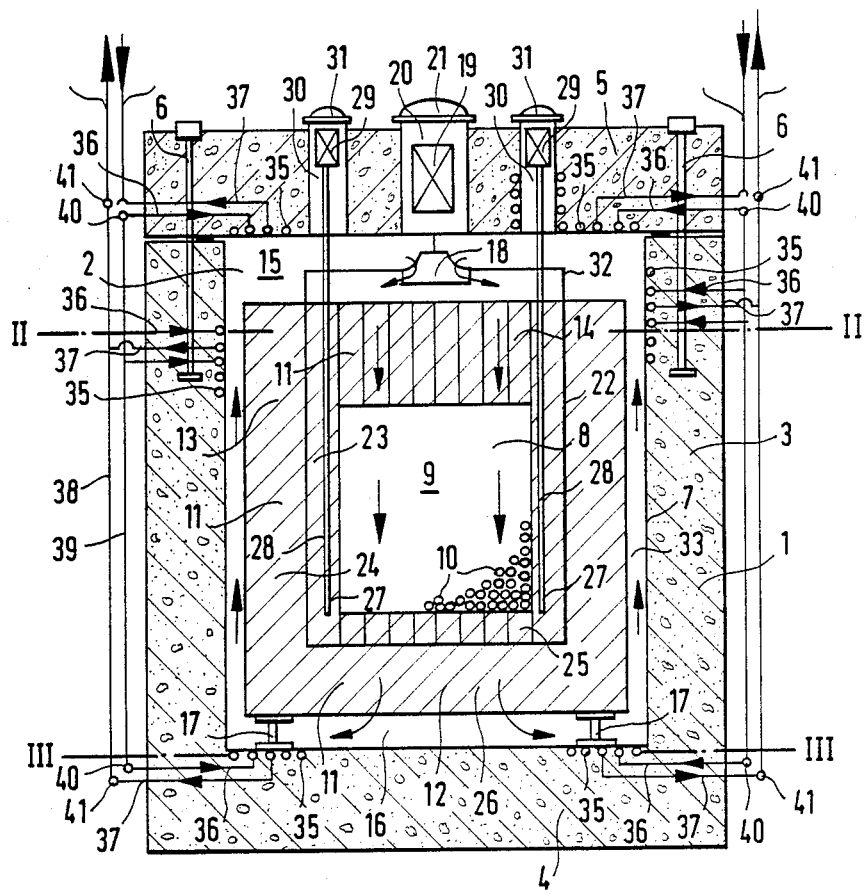
FIG. 1 shows a longitudinal section through a nuclear reactor installation with the reactor pressure vessel according to the present invention.

FIG. 1 shows a steel reinforced concrete reactor pressure vessel 1 enclosing a cavity 2 and comprising a plurality of reinforcing elements installed in the radial and the axial direction (not shown), absorbing all of the tensile forces resulting from the internal pressure of the vessel.

The vessel 1 consists of a cylindrical jacket 3, a bottom plate 4 and a cover plate 5. The cover plate 5 is held down on the vessel 1 by means of clamping elements 6. The cover plate may be lifted off if necessary, thereby rendering the cavity 2 accessible from the exterior. The clamping elements 6 are monitored from the exterior of the vessel. The vessel 1 is lined on the inside over its entire surface with a metal liner 7, which performs a sealing function.

A nuclear reactor 8 is housed in the cavity 2, the core of which consists of a stationary pile 9 of spherical fuel elements 10. The pile 9 has a diameter of approximately 1.2 to 1.5 m and a height of approximately 1.5 to 2.5 m. The power density in the core amounts to approximately 1.5 to 2.5 MW/m$^3$ and enables a total power output of 10 to 20 MW$_{th}$ to be provided. The fuel elements 10, which are produced by hot or cold pressing methods, contain approximately 20 to 40 g of heavy metal per sphere. The pile 9 is surrounded on all sides by a graphite reflector 11, which consists of a bottom reflector 12, a side reflector 13 and a roof reflector 14.

The roof reflector 14 rests directly on the pile 9. A free space 15 is located between the topmost portion of the roof reflector and the inside surface of the cover plate 5. An additional free space 16 is provided between the bottommost portion of the bottom reflector 12 and the inside surface of the bottom plate 4 of the pressure vessel 1. A metal support means 17 is located in this space, which supports the nuclear reactor 8 upon plate 4.

A cooling gas, preferably helium, flows from top to bottom through the pile 9 circulated by means of a blower 18 as indicated by the arrows. The blower 18 is centrally mounted in a vertical position on the inside of the cover plate 5, with its rotor located in the free space 15. The drive motor 19 for the blower 18 is installed in a passage 20 centrally located on the cover plate 5 and equipped on the outside with a removable closure means 21.

The pile 9 is enclosed laterally and on the bottom by a steel core vessel 22, which also enables part of the side reflector 13 and the bottom reflector 12. The side and bottom reflectors are accordingly divided into inner and outer reflector parts. In the side reflector 13 the inner reflector is designated as 23 and the outer reflector as 24. In the bottom reflector the same parts are identified as 25 and 26. In the inner side reflector 23 vertical channels 27 are provided in which absorber rods 28 are displaceably positioned for trimming and shutdown purposes. The drives 29 for the absorber rods 28 are installed in passages 30 of the cover plate 5 and are equipped with removable closure means 31.

The core vessel 22 may be removed upwardly, together with the inner side reflector 23, the roof reflector 14, the fuel elements 10 and the absorber rods 28, following the removal of the cover plate 5. A shielding bell is used in the removal process. The absorber rods 28 assure the subcriticality of the pile 9 during the dismantling and installation process. The core vessel 22 is removed when the fuel elements 10 are burned up sufficiently.

A gas guide jacket 32 separating the suction and the pressure side of the blower is located in free space 15 and attached to the upper end of the core vessel 22.

The absorber rods 28 are provided only for trimming and shutdown. The reactor output is controlled by the rpm of the blower 18 and the secondary flow through a heat removal system (to be described) alone, utilizing the negative temperature coefficient inherent in a fuel pile reactor. The blower 18 draws the cooling gas, the pressure of which is set in normal operation to approximately 10 to 20 bar, from the free space 15 and passes same to the pile 9. In the course of its flow though the pile 9 the temperature of the gas rises from approximately 300° C. to 500° C. The heated cooling gas enters the free space 16 through openings in the core vessel 22 and the bottom reflector 12, where it is distributed and conducted into annular space 33 from where it is returned to free space 15.

The pressure of the cooling gas is chosen so that it is higher than the pressure of the secondary medium in the heat removal system.

The heat removal system of the nuclear reactor 8 is designed so that the heat generated in the pile 9 may be removed safely both during power operations and the elimination of decay heat. Heat exchanger means is provided as the heat removal system and consists of the liner 7 and a plurality of cooling pipes 35 mounted on the concrete jacket side of the liner 7, with water flowing through the pipes. The cooling pipes 35 also serve to anchor the liner 7 within the pressure vessel as there are no other anchoring elements. To prevent the buckling of the liner 7 in the area of the cylindrical jacket 3, an appropriate thickness is specified as a function of the dimensions of the cavity 2.

Each cooling pipe 35 is connected by means of lines passing through the pressure vessel 1 with collectors located outside the pressure vessel 1 for the inlet passage of water and the return of steam. One line 36 serves as the inlet line, while line 37 is the outlet line. The collecting pipe means for the cooling pipes 35 in the bottom, cover and jacket areas of the pressure vessel 1 are different in their configuration, as described below.

The heat exchanger means comprises on the secondary side several mutually independent systems. In the example of embodiment depicted there are two systems A and B. The cooling pipes 35 are employed in a manner such that adjacent cooling pipes and inlet lines 36 and outlet lines 37 are associated with different systems, with water or steam flowing through adjacent pipes in opposite directions. The heated helium gas conducted in the upward direction through the annular space 33 (subsequent to the passage through the reactor) flows along the liner 7 and transfers thermal energy to the water in the cooling pipes 35.

Figure 2:
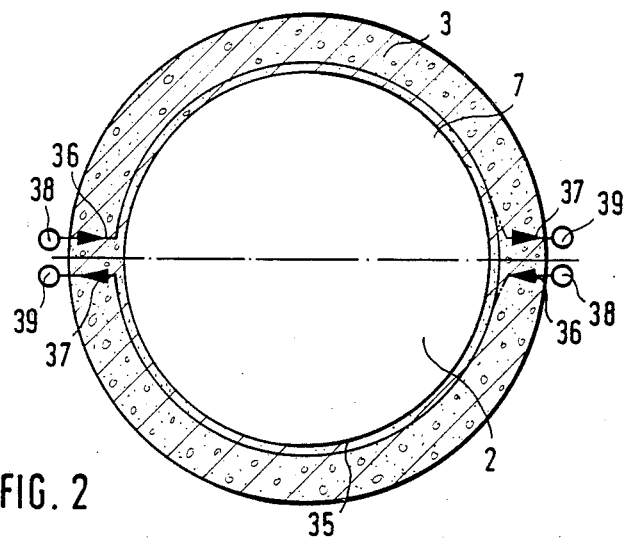
FIG. 2 shows a section through the reactor pressure vessel on the line II—II of FIG. 1.

Within the cylindrical concrete jacket 3 of the pressure vessel 1 the cooling pipes 35 of both of the systems A and B are installed in horizontal planes, as shown in FIG. 2 and are placed so that they encompass the liner over its entire circumference. The horizontal planes of the systems A and B are offset relative to each other as shown in FIG. 1 with system A on the left and system B on the right. Each of the systems comprises as collector pipe means for the fore-and after runnings a vertical pipe section 39 (inlet) and 38 (return). All of the pipe sections of the collector pipe means are located outside the pressure vessel 1 (FIG. 1 shows the pipe sections 38, 39 offset).

FIG. 2 shows the mutual layout of the pipe sections 38 and 39 of the systems A and B which oppose each other diametrically on the pressure vessel 1. The two collector pipe means for the inlet and return of the same system are placed directly adjacent to each other.

Figure 3:
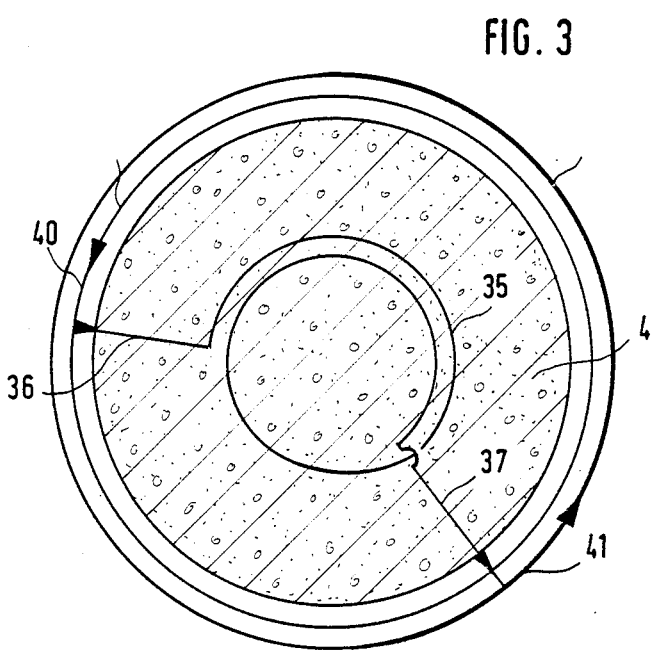
FIG. 3 shows a section through the reactor pressure vessel on the line III—III of FIG. 1.

Within the cover plate 5 and the bottom plate 4 of the pressure vessel 1 the cooling pipes 35 are installed helically, as shown in FIG. 3 for one of the systems A and B. In order to obtain identical flow resistances in the cooling pipes 35, they are all of the same length and therefore have different angles of contact. In both areas, circular collector pipes 40 are provided for the forerunnings and 41 for the afterrunnings, the layout of which is such that their connection with the corresponding collector pipe means 38, 39 in the form of pipe sections is assured. This fact may be seen in FIG. 1 (the circular collector pipe means 41 is shown in an offset position in FIG. 1 and 3).

The circular collector pipe means 40, 41 provided at the height of the cover plate 5 of both of the systems A and B, connected by means of radial inlet lines 36 and outlet lines 37 with the cooling pipes 35 located in the cover plate 5, are connected with the corresponding collector pipe means 38, 39 by releasable connecting elements, so that the removal of the cover plate 5 (for example, to replace fuel elements) poses no problems.

Figure 4:
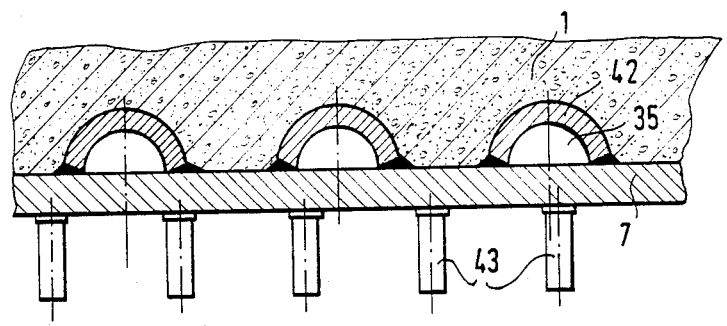
FIG. 4 shows an enlarged detail of the heat exchanger means employed in the present invention.
Figure 5:
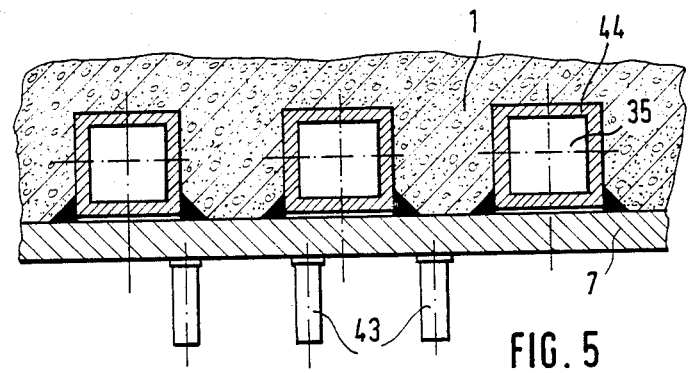
FIG. 5 shows an alternative embodiment of the detail shown in FIG. 4.
Figure 6:
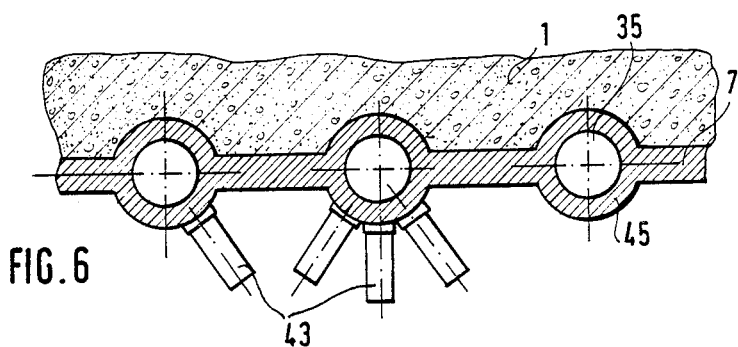
FIG. 6 shows a further alternative embodiment of the detail shown in FIG. 4.

FIGS. 4, 5 and 6 show several possible alternative configurations of the heat exchanger cooling pipes 35.

In FIG. 4 the cooling pipes 35 are in the form of semispherical shells 42, welded to the concrete side of the liner 7. In order to avoid damaging the integrity of the liner in case of a failure (leaking) of a semispherical shell 42, the wall thickness of the semispherical shells 42 and thus the thickness of the weld seams are adjusted to the thickness of the liner. To the surface of the liner 7 on the gas side a large number of pins 43 are welded (preferably by means of percussion welding). The function of the pins is to improve the transfer of heat from the cooling gas to the liner 7 and thus to the cooling pipes 35. Welded pins offer relative to welded ribs both fabricating and economic advantages.

The cooling pipes 35 shown in FIG. 5 have square cross sections 44. They are also welded to the liner 7. The liner may here again be provided with welded pins 43 on the gas side.

As seen in FIG. 6, the cooling pipes 35 may be in form of finned tubes 45, integrated with and forming a portion of the liner 7. The pins 43 are in this case formed directly upon the finned tubes 45.

What is claimed is:

1. A low capacity 10–20 MW spherical fuel element, gas cooled nuclear reactor concrete pressure vessel comprising:
   a pressure vessel defined by a cylindrical concrete jacket having a bottom plate and a cover plate;
   a metal liner positioned adjacent the interior surfaces of said pressure vessel to seal said pressure vessel;
   a primary heat exchanger comprising a plurality of cooling pipes adapted for the flow of cooling water therethrough, said pipes being positioned within said cylindrical concrete jacket and attached to said metal liner and anchoring same to said concrete jacket,
   said cooling pipes comprising respective portions of mutually independent heat exchange systems which further include separate collector pipe means outside of said reactor pressure vessel and connected to said cooling pipes and adapted to both provide cooling water and recover steam resulting from passage of said cooling water through said cooling pipes.

2. The reactor pressure vessel according to claim 1, wherein said cover plate is removable.

3. The reactor pressure vessel according to claim 1, wherein said removable cover plate is held in place by clamping means.

4. The reactor pressure vessel according to claim 3, wherein said clamping means passes longitudinally through both the cylindrical jacket and the bottom plate of the reactor pressure vessel.

5. The reactor pressure vessel according to claim 1, wherein said cooling pipes of said heat exchange systems are disposed in horizontal planes within said cylindrical jacket in a manner such that they encompass said liner over its entire circumference.

6. The reactor pressure vessel according to claim 1, wherein said collector pipe means of one heat exchange system are positioned diametrically opposite said collector pipe means of a second heat exchange system.

7. The reactor pressure vessel according to claim 1, wherein cooling pipes connected to each independent heat exchange system are positioned helically within the bottom plate and the cover plate of the reactor pressure vessel, the cooling pipes of each system being connected to separate collector pipe means.

8. The reactor pressure vessel according to claim 7, wherein collector pipe means which positioned in height at said cover plate are releasably connected with the remaining portion of the collector pipe means.

9. The reactor pressure vessel according to claim 1, wherein said cooling pipes comprise semispherical shells attached to the concrete side of the liner.

10. The reactor pressure vessel according to claim 1, wherein said cooling pipes have square cross-sections and are attached to the concrete side of the liner.

11. The reactor pressure vessel according to claim 1, wherein said cooling pipes have circular cross sections and are attached to the concrete side of the liner.

12. The reactor pressure vessel according to claim 1, wherein said cooling pipes are finned tubes comprising an integral portion of the liner.

13. The reactor pressure vessel according to claim 7, wherein a plurality of heat exchange pins are welded onto the interior surface of the liner.

14. The reactor pressure vessel according to claim 5, wherein the cooling pipes of the respective heat exchange systems are offset with respect to one another.

15. The reactor pressure vessel according to claim 5, wherein said cooling pipes are arranged such that adjacent cooling pipes are traversed by the flow of water in opposing directions.

16. The reactor pressure vessel according to claim 5, wherein a plurality of heat exchange pins are welded onto the interior surface of the liner.

17. The reactor pressure vessel according to claim 1, wherein a plurality of heat exchange pins are welded onto the interior surface of the liner.

* * * * *